June 17, 1958     O. L. BURTON     2,838,987
POWER LIFT DISC CULTIVATOR FOR TRACTORS
Filed Oct. 12, 1953     4 Sheets—Sheet 2

OLLIE L. BURTON
*INVENTOR.*

BY *Smith & Tuck*

June 17, 1958  O. L. BURTON  2,838,987
POWER LIFT DISC CULTIVATOR FOR TRACTORS
Filed Oct. 12, 1953  4 Sheets-Sheet 3

OLLIE L. BURTON
INVENTOR.

BY Smith & Tuck

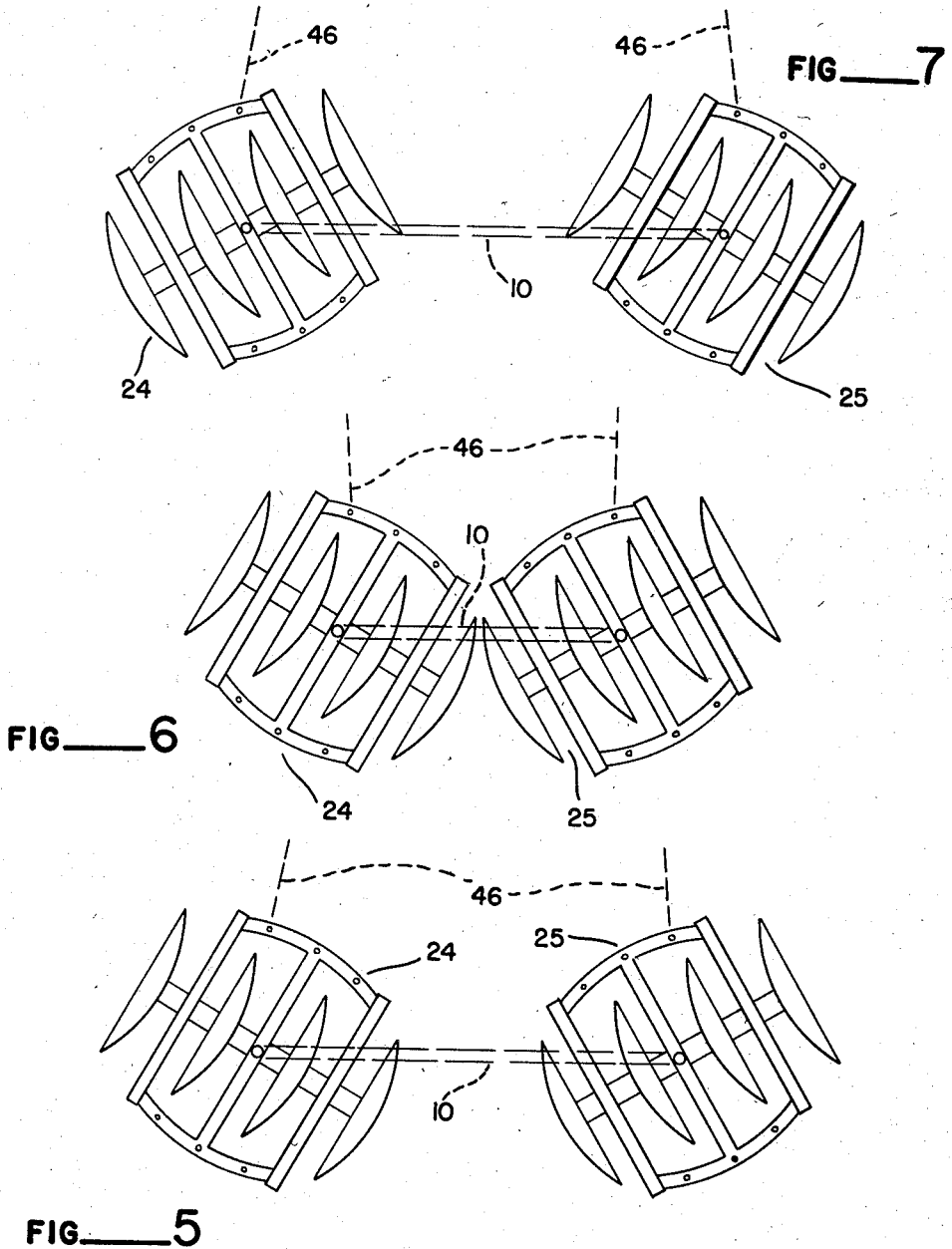

United States Patent Office 2,838,987
Patented June 17, 1958

2,838,987
POWER LIFT DISC CULTIVATOR FOR TRACTORS

Ollie L. Burton, Renton, Wash.

Application October 12, 1953, Serial No. 385,405

2 Claims. (Cl. 97—47.63)

This present invention relates to the general class of disc cultivators intended for use with farm tractors, and more particularly, it is adaptable to the easy control of the operator, mounted on the usual driver's seat of the tractor. This cultivator is characterized by having two sets of discs, each set of which is individually mounted upon a vertical pivot so that the disc can be readily adjusted to various presentation angles, and further they may be readily revolved through 180 degrees so that the two cooperative disc units may produce a built-up row to protect a growing row of crops; or in the reverse position, the discs can take the soil away from the crop row. Adjustment means is provided so that the two sets of discs may be varied in their transverse position so as to have either a narrow untilled row between them or they may be adjusted to give considerable clearance as in a cultivating crop that is well advanced. Other features of this equipment make it possible to insure full control of the equipment at all times and to particularly adapt the equipment to tilling uneven ground or ground in which the resistance to the penetration of the discs may vary from place to place.

In the past many attempts have been made to give the same facility in the use of a disc harrow or cultivator behind a tractor as was formerly experienced with disc arrangements adapted to horse-drawn use. In the latter case, the driver of the team was able to more carefully supervise the action of the discs and they were more readily in his line of vision due in part to the fact that the walking gait of the team was relatively slow, and secondly, the driver either walked behind the unit or was provided with a seat normally behind and slightly above the discs as they were working. In a farm tractor, to obtain maximum advantage of the mechanization, the operating speeds have been increased and unfortunately the driver is placed in a position in front of the discs. This factor, coupled with the need for a more careful direction of the tractor than was experienced with the team, requires that the cultivator assembly be provided with means which will more or less take care of the various changing conditions of the moment and leave the driver free to properly guide the equipment. This is particularly desirable when the driver may have his mind quite fully occupied in straddling a crop row which he must watch constantly in order that he may not damage the same. In the various attempts to meet this problem that have been observed, the different pieces of equipment have to a degree solved the problm. Howver in this present invention it is believed that a very worthwhile advancement has been made in this field in that the equipment is subject to accurate adjustment to meet the varying conditions and then when placed in service, the arrangements are such that the cultivator will take care largely of all of the conditions of the moment leaving the driver of the tractor free for his prime task of actually guiding the tractor so as to give the end result he desires without damage to the crop rows.

The principal object of this present invention is to provide a tractor-drawn disc cultivator which can be successfully employed in the cultivation of various types of row crops and which is provided with linkage and resilient means so that all normal changes in the penetration of the discs, as experienced from time to time, will be automatically taken care of by the cultivator itself without direct observation or attention from the driver.

A further object of this invention is to provide a pair of disc units each of which is separately mounted on vertical pivots so that the discs can be made to move the dirt both ways from the center or can be made to move the dirt toward the center from both extremes or outer discs of each assembly.

A further object of this invention is to provide a transversely disposed main frame above the disc assemblies and to which the same are adjustably secured. The purpose of this main frame is to provide a common base for the two sets of discs so that the same may be adjusted with respect thereto and after the adjustment is made, the frame will assure the preservation of that adjusted position.

A further object of this invention is to provide a connecting bar adapted to couple the cultivator of the unit to the power lift mechanism of the tractor and to provide a plurality of guideways each with a guide and lifting rod which are pivotably connected to the main frame assembly. On these guide rods is provided means for resiliently placing downward pressure on the disc assemblies and further means are provided so that these rods can operatively couple the unit to the power means of the tractor to the end that the entire disc assemblies can be raised and clear the ground as for transportation and the like.

Further objects, advantages and capabilities will be apparent from the description and disclosure in the drawings, or may be comprehended or are inherent in the device.

In the drawings:

Figures 5 and 6 are diagrammatic plan views illustrating two positions of the disc assemblies adjusted to throw the soil outwardly from the center or line of draft of the unit;

Figure 7 is a view similar to Figures 5 and 6 but illustrating the disc units revolved 180 degrees so that the soil is moved from the outer margins of the equipment toward the center or line of draft thereof.

Figure 2:
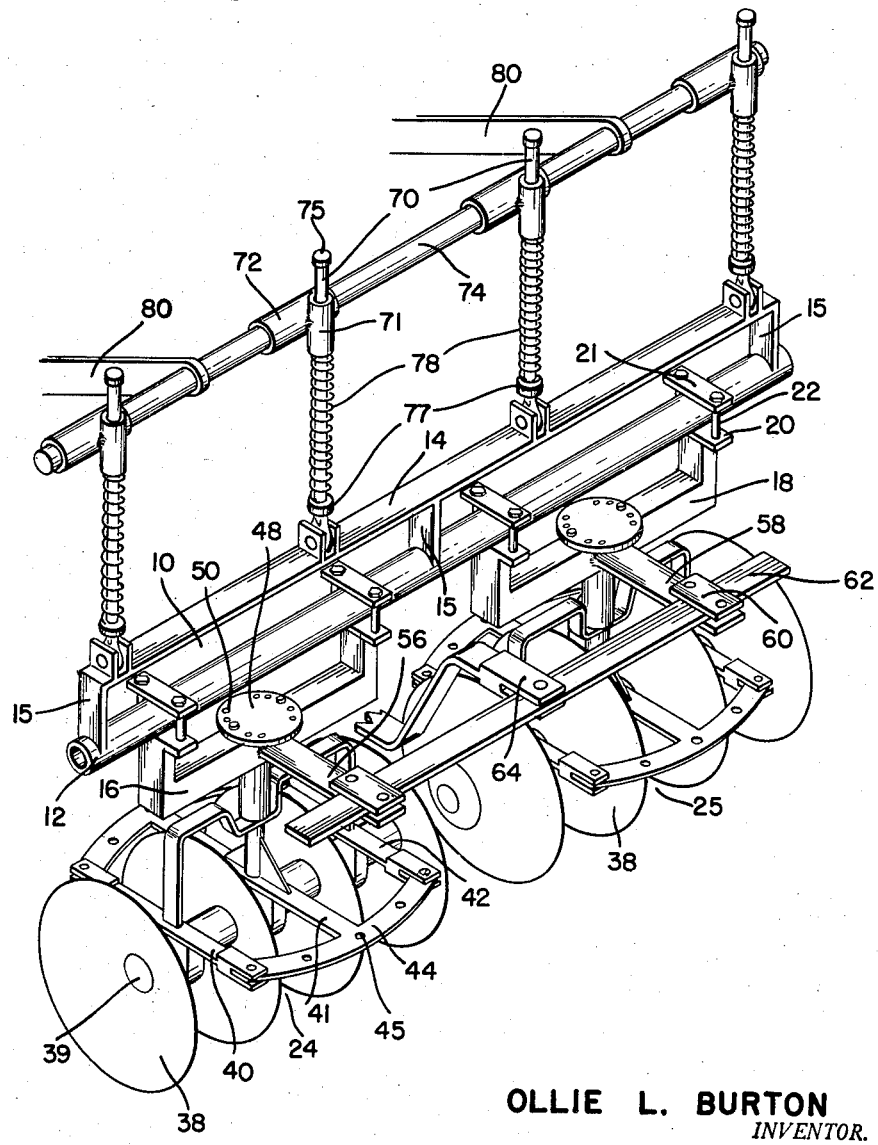
Figure 2 is a perspective view illustrating the principal parts of my disc cultivator and the mounting means employed therewith.
Figure 3:
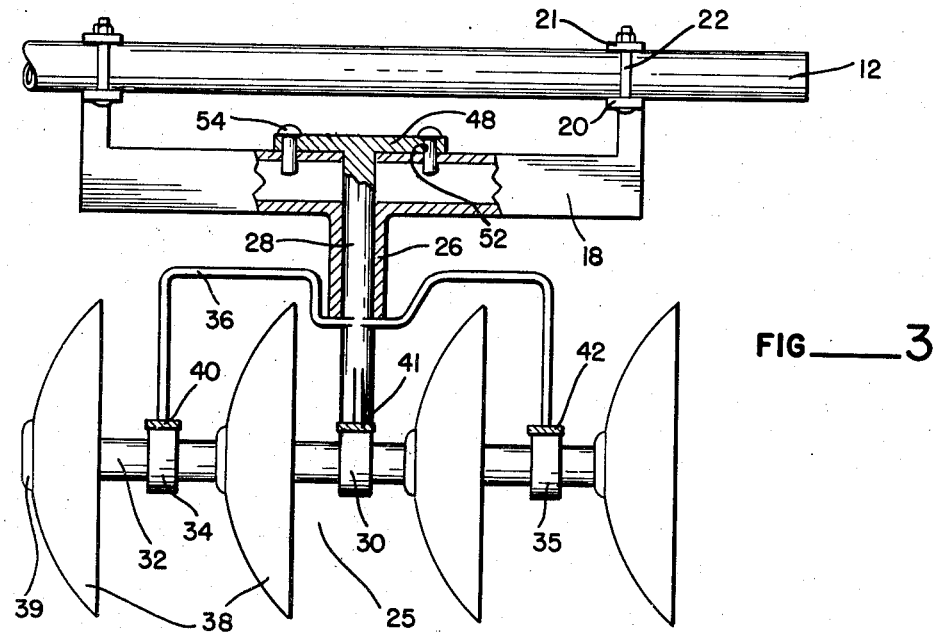
Figure 3 is a vertical side view of one of the disc assemblies, certain parts being shown in section to better illustrate the construction.
Figure 4:
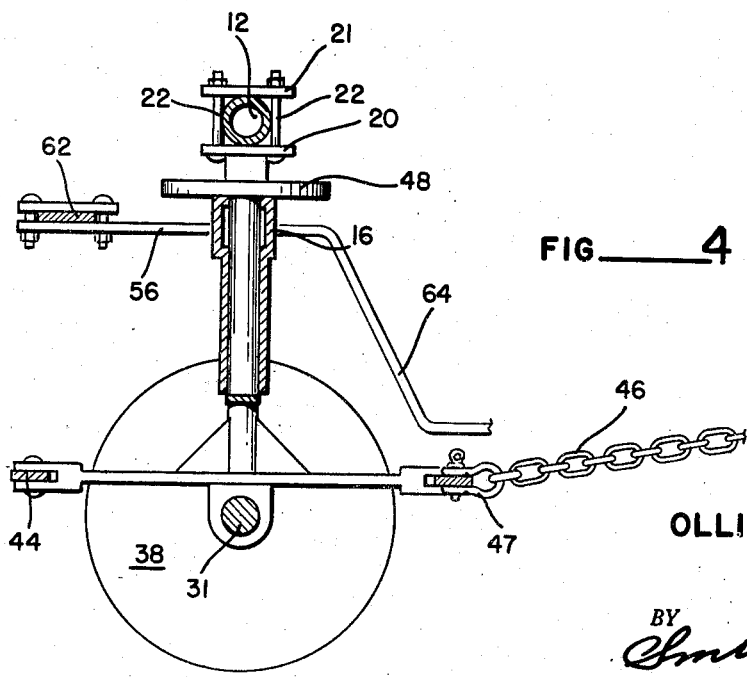
Figure 4 is an end view of the assembly of Figure 3 in which certain parts are again shown in section to better illustrate the construction.

Referring more particularly to the disclosure in the drawings, the numeral 10 designates generally the main frame member. This frame consists preferably of the longitudinal tubular member 12 and spaced therefrom upper frame member 14. These two frame members are joined together as a unit by a plurality of struts 15 which are preferably welded in place so as to form a solid composite frame of members 12 and 14. The arrangement illustrated in Figure 2 is a preferred structure in which a single strut member 15 is disposed centrally of the frame with the other two strut members at the opposite ends of the same. This makes it possible to have a reasonable latitude of adjustment for the trunnion-carrying members 16 and 18 as will be noted by reference to Figures 5, 6 and 7. These members are preferably clamped to tube 12 by having upwardly raised bearing portions 20 and coacting tie plates 21 which are secured thereto by a plurality of bolts, 22. Such an arrangement permits the bearing members 16 and 18 to be adjustably positioned longitudinally of the transverse frame 10 and this determines the central clearance between the two sets of discs designated generally as 24 and 25. The pivoting action of the disc group or assemblies is probably best illustrated in Figures 3 and 4. Bearing members as 16 and 18 are provided with a downwardly extending bearing 26 and disposed for adjusted revolution within these bearings is the pivot shaft 28. Shaft 28 is preferably continued downwardly until it is joined as by welding to the bearing collar 30 which surrounds the disc assembly shaft 31. In order to give maximum stiffness to shaft 31 which is relatively light in that it has around it the disc bushings or hubs 32, additional bearing members are provided at 34 and 35. These two bearing members are connected effectively to frame 10 by means of the steel bar 36 which in turn is fixedly secured to shaft 28. The actual discs as 38 may be mounted for revolution upon shaft 31 following any of the accepted plans. This is usually achieved by having the discs secured to the sleeve or hub portions 32 and these portions in turn form the bearings on which the disc revolves about shaft 31. Suitable end securing means as 39 is provided at each end of shaft 31 to hold the discs on the shafts as a working unit.

Secured in close proximity to shaft 31, as being welded or otherwise fixedly secured to bearing members 30, 34, and 35, are bars 40, 41, and 42, disposed transversely of shaft 31. These bars serve to position arcuate members 44, one on each side of shaft 31 and disposed sufficiently far removed that the discs can revolve freely within the confines of the two arcuate members. These members are provided with a plurality of draft holes 45 to which draft chains as 46 are secured by some convenient means as by means of the shackles 47.

At its upper end shaft 28 is provided with a flange 48 in which is spaced a plurality of through openings 50. These holes are disposed in diametrically opposite pairs so that each pair may engage the two holes 52 drilled in the upper horizontal portion of bearing members 16 and 18. Coacting with these two groups of holes are bolts or headed pins 54. The purpose of this arrangement is to provide for the angularly-positioning and locking of shaft 28 and to thus determine and maintain the angularity of shaft 31 with respect to the line of draft so that the various relationship as shown in Figures 5, 6, and 7 can be determined and fixed, yet fixed in a manner permitting further ready adjustment if conditions change and the same is desirable.

Figure 1:
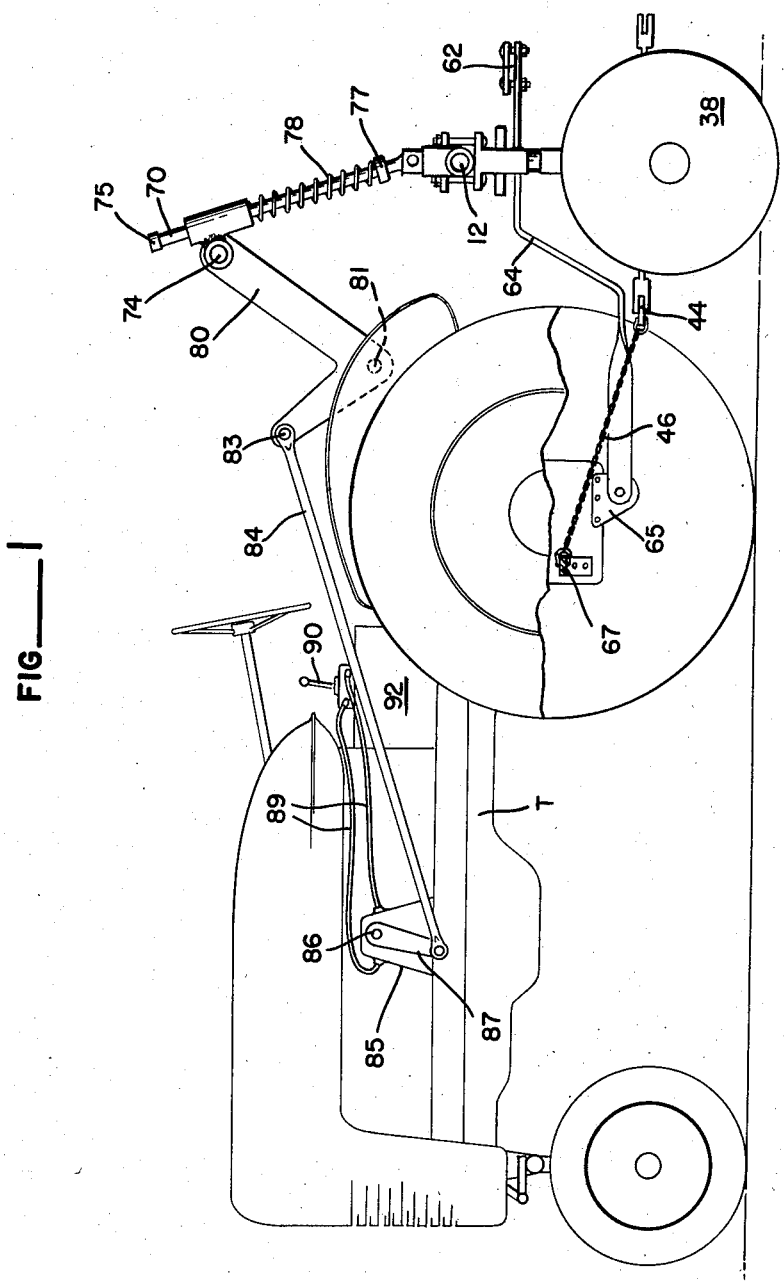
Figure 1 is a side elevation of a typical farm tractor showing the manner in which my equipment is secured in operative relationship thereto.

Fixedly secured to or made as part of bearing members 16 and 18 are rearwardly extending bars 56 and 58. These bars are provided with clamp plates 60 and suitable clamping bolts so that the two bars 56 and 58 can be clamped in fixed relationship to grasp the transverse draft bar 62. In forming the clamp members, sufficient clearance must be provided so that the clamping action can be obtained in any of the various angular positions to which it is desirable to adjust the disc assemblies. At its midpoint draft bar 62 is engaged by the draft link 64 which in turn is carried forward to the towing bracket or tractor hitch 65 of the tractor T. These towing brackets vary in construction with the different types of tractors and member 64 must be adapted to the particular tractor with which this equipment is to be employed. The showing of this arrangement will be noted in Figure 1 as will also the attachment of the towing chains 46 which are preferably secured centrally of the tractor on the transversely disposed cross bar 67.

Pivotably secured to upstanding brackets formed as part of the upper main frame member 14 is a plurality of guide and lifting rods 70. These rods are adapted to slide within ferrule members 71 which are part of the assemblies including the bearing portions 72 which are free to rotate slightly upon the control shaft 74. Guide members 70 are each provided with heads 75, the combined strength of which is sufficient to raise the entire implement vertically. Near their lower ends guides 70 are provided with abutments or collars 77 so that a compression spring 78 may be disposed between each set of collars 77 and the end of ferrule 71. This arrangement permits resiliently-applied pressure to be directed downwardly upon the disc assembly and when the resistance encountered by the discs is great enough the discs can move upwardly against this spring pressure and then as soon as the added resistance has been passed, spring 78 serves again to seat the implement to the predetermined depth or pressure. This same flexibility permits the discs to follow uneven ground where the relatively long wheel base of the tractor might otherwise tend to give them excessive penetration or to raise them off the ground momentarily.

Shaft 74, which may be considered as a controlling shaft, is also the lifting means for the device. This is achieved by the mechanism probably best illustrated in Figure 1 wherein the bell crank 80 is pivotably secured at 81 to the tractor assembly with one leg engaging shaft 74 and the other leg providing an anchor at 83 for the control rod 84. The action of this rod is generally reciprocal and this may be achieved in any one of a number of ways, depending upon the tractor equipment to which it is applied. In the present showing a fluid assembly 85 is provided with an output shaft 86 and the operating arm 87. Oil tubes 89 lead from this assembly to a control lever 90 which lever in turn controls the amount and direction of flow of oil under pressure. This pressure fluid is provided normally by a pump arrangement as 92 of which there are many different and standardized types supplied by the various tractor manufacturers.

*Method of operation*

A very important use of equipment of this order is the tilling of crop rows and depending upon the season and the type of plants or crops being tilled, the disc assemblies must be adjusted to give the soil movement desired. Referring to Figure 5, it will be noted from the angularity of the discs that they will throw the dirt both ways from the center. In other words, each assembly with its discs faced the same will move the dirt away from center. In the adjustment illustrated in Figure 5, a considerable central area will be left unworked and this will be necessary in many crops where the plant has reached some height. This height of course must not exceed that which can be passed under the central portions of the implement.

It will be noted in Figure 6 that the disc assemblies have been moved quite close together so that practically all the ground will be tilled. This is a condition that would only maintain where crop rows were spaced well apart so that the tractor and the implement could pass through the same and it would be desirable to move the dirt both ways toward the rows.

In Figure 7 another adjustment of the disc is shown in which the disc assemblies are again moved quite well apart and in this instance the dirt is moved toward the line of draft of the implement. This would tend to bank up the dirt around the plants within the straddled rows and the adjusted distance between the two disc assemblies would have to be such that the plants would not be damaged. Figures 5, 6, and 7 illustrate only typical adjustments within the range of this equipment. If a study is made of the adjustable features of this equipment it will be apparent that a wide range of adjustment is possible so that any anticipated uses to which disc harrows could be employed would be satisfactorily served.

It is believed that it will be clearly apparent from the above description and the disclosure in the drawings that the invention comprehends a novel construction of a power lift disc cultivator for tractors.

Having thus disclosed the invention, I claim:

1. A disc cultivator for use with a tractor, comprising: a supporting frame including a common tie bar and a pair of separate supporting bars positioned below the tie bar at either side of the middle thereof and clamp means at each end of the supporting bars manually adjustable to clamp the tie bar at various locations permitting adjustable spacing of the supporting bars; a pair of separate banks of discs positioned one under each supporting bar and each bank having a series of juxtaposed discs rotatably mounted on a common shaft; a secondary frame for each bank of discs including bearings for said common shaft and an upstanding central pivot shaft; a bearing depending from each supporting bar in which the corresponding pivot shaft is positioned and manually adjustable means on the pivot shafts for locking the banks of discs relative the supporting bars at various angles of presentation relative the direction of movement of the cultivator; flexible draft means leading directly forward from each secondary frame and attachable to the tractor; a rigid connecting arm extending rearwardly from each supporting bar and fixedly secured thereto, a rigid transverse bar extending between the rear ends of said connecting arms and connected thereto by adjustable connecting means with the points of connection adjustable along the transverse bar, a rigid draft bar having its front end attachable to a tractor hitch and having it rear end connected to the middle of said transverse bar by means permitting pivoting of the draft bar relative to the transverse bar about an upright axis and securing the transverse bar, connecting arms and secondary frames against tipping out of a generally horizontal position.

2. A disc cultivator for use with a tractor, comprising: a supporting frame including a common tie bar and a pair of separate supporting bars positioned below the tie bar at either side of the middle thereof and securing means at each end of the supporting bars manually adjustable to secure the supporting bars to the tie bar spaced apart various distances; a pair of separate banks of discs positioned one under each supporting bar and each bank having a series of juxtaposed discs rotatably mounted on a common shaft; a secondary frame for each bank of discs including bearings for said common shaft and including upstanding pivotal means connecting with the associated supporting bar and manually operable locking means for securing the pivotal means with the discs at various angles of presentation relative the direction of movement of the cultivator; a rigid connecting arm extending rearwardly from each supporting bar and fixedly secured thereto, a rigid transverse bar extending between the rear ends of said connecting arms and connected thereto by adjustable connecting means with the points of connection adjustable along the transverse bar, a rigid draft bar having its front end attachable to a tractor hitch and having its rear end connected to the middle of said transverse bar by means permitting pivoting of the draft bar relative the transverse bar about an upright axis and securing the transverse bar, connecting arms and secondary frames against tipping out of generally horizontal positions.

References Cited in the file of this patent

UNITED STATES PATENTS

| Number | Name | Date |
|---|---|---|
| 845,902 | Sharp | Mar. 5, 1907 |
| 944,415 | Conklin | Dec. 28, 1909 |
| 1,023,704 | Abbott | Apr. 16, 1912 |
| 1,846,489 | Johnson | Feb. 23, 1932 |
| 2,140,144 | Silver | Dec. 13, 1938 |
| 2,431,959 | Olson et al. | Dec. 2, 1947 |
| 2,512,114 | Robinson et al. | June 20, 1950 |
| 2,588,872 | Price | Mar. 11, 1952 |

FOREIGN PATENTS

| Number | Country | Date |
|---|---|---|
| 221,501 | Germany | Apr. 8, 1910 |
| 986,380 | France | Mar. 21, 1951 |